United States Patent
Welborn et al.

(10) Patent No.: US 7,570,712 B2
(45) Date of Patent: Aug. 4, 2009

(54) SYSTEM AND METHOD FOR TRANSMITTING ULTRAWIDE BANDWIDTH SIGNALS

(75) Inventors: Matthew L. Welborn, Vienna, VA (US);
John W. McCorkle, Vienna, VA (US);
Roberts D. Richards, West Melborne, FL (US); Phuong T. Huynh, Annandale, VA (US)

(73) Assignee: Freescale Semiconductor, Inc., Austin, TX (US)

( * ) Notice: Subject to any disclaimer, the term of this patent is extended or adjusted under 35 U.S.C. 154(b) by 495 days.

(21) Appl. No.: 10/546,219

(22) PCT Filed: Feb. 27, 2004

(86) PCT No.: PCT/US2004/003364

§ 371 (c)(1),
(2), (4) Date: Aug. 18, 2005

(87) PCT Pub. No.: WO2004/079938

PCT Pub. Date: Sep. 16, 2004

(65) Prior Publication Data

US 2006/0251148 A1   Nov. 9, 2006

Related U.S. Application Data

(60) Provisional application No. 60/450,314, filed on Feb. 28, 2003, provisional application No. 60/452,016, filed on Mar. 6, 2003.

(51) Int. Cl.
*H03C 3/00* (2006.01)
*H04B 1/00* (2006.01)
(52) U.S. Cl. .................. 375/307; 375/146; 375/295

(58) Field of Classification Search ......... 375/140–152, 375/295, 307
See application file for complete search history.

(56) References Cited

U.S. PATENT DOCUMENTS

| | | | | |
|---|---|---|---|---|
| 5,592,129 | A * | 1/1997 | Fried et al. | 331/111 |
| 5,764,111 | A * | 6/1998 | Bushman | 331/57 |
| 6,026,125 | A | 2/2000 | Larrick, Jr. et al. | |
| 6,148,225 | A * | 11/2000 | Kestler et al. | 600/411 |
| 6,384,773 | B1 * | 5/2002 | Martin et al. | 342/202 |
| 6,505,032 | B1 * | 1/2003 | McCorkle et al. | 455/41.2 |
| 6,668,008 | B1 * | 12/2003 | Panasik | 375/139 |
| 6,760,397 | B2 * | 7/2004 | Wu et al. | 377/47 |
| 6,895,059 | B2 * | 5/2005 | Rogerson et al. | 375/295 |
| 6,968,017 | B2 * | 11/2005 | Nielsen | 375/316 |
| 7,010,056 | B1 * | 3/2006 | McCorkle et al. | 375/295 |

(Continued)

OTHER PUBLICATIONS

Notification of the First Office Action dated Aug. 8, 2008 in corresponding Chinese Patent Application No. 20040005365.8 (and an English translation thereof).

(Continued)

*Primary Examiner*—Jason M. Perilla

(57) ABSTRACT

A method is provided for generating a multiple band ultrawide bandwidth signal. In this method, an ultrawide bandwidth devices provides a first reference signal having a first reference frequency, and a second reference signal having a second reference frequency that is different from the first reference frequency. The device generates a first ultrawide bandwidth signal based on the first reference signal, and a second ultrawide bandwidth signal based on the second reference signal, creating two separate frequency bands. These two signals can be generated form the same base clock signal, allowing for significantly simpler implementation and modification.

22 Claims, 6 Drawing Sheets

U.S. PATENT DOCUMENTS

| | | | | |
|---|---|---|---|---|
| 7,042,257 | B2* | 5/2006 | Wang | 327/115 |
| 7,263,333 | B2* | 8/2007 | Roberts | 455/67.13 |
| 2001/0033576 | A1 | 10/2001 | Richards | |
| 2002/0036935 | A1* | 3/2002 | Park et al. | 365/200 |
| 2002/0167991 | A1* | 11/2002 | Suzuki | 375/130 |
| 2003/0030471 | A1* | 2/2003 | Wang | 327/115 |
| 2003/0099299 | A1* | 5/2003 | Rogerson et al. | 375/253 |
| 2003/0162498 | A1* | 8/2003 | Rofheart et al. | 455/41 |
| 2004/0028011 | A1* | 2/2004 | Gehring et al. | 370/330 |
| 2004/0048574 | A1* | 3/2004 | Walker et al. | 455/63.1 |
| 2005/0013345 | A1* | 1/2005 | Choi | 375/130 |
| 2005/0180375 | A1* | 8/2005 | Batra et al. | 370/344 |
| 2005/0180515 | A1* | 8/2005 | Orihashi et al. | 375/260 |
| 2005/0190817 | A1* | 9/2005 | Batra et al. | 375/130 |
| 2005/0232371 | A1* | 10/2005 | Rogerson et al. | 375/295 |
| 2005/0271118 | A1* | 12/2005 | Paquelet | 375/130 |
| 2005/0276310 | A1* | 12/2005 | Choi et al. | 375/130 |
| 2006/0114879 | A1* | 6/2006 | Welborn et al. | 370/347 |
| 2007/0140645 | A1* | 6/2007 | Marsili et al. | 386/23 |
| 2007/0155350 | A1* | 7/2007 | Razavi et al. | 455/147 |
| 2007/0177653 | A1* | 8/2007 | Bjerede | 375/130 |
| 2007/0298750 | A1* | 12/2007 | Masuda | 455/323 |
| 2008/0019346 | A1* | 1/2008 | Choi et al. | 370/343 |
| 2008/0069181 | A1* | 3/2008 | Lee et al. | 375/130 |
| 2008/0094299 | A1* | 4/2008 | Williams | 343/836 |

OTHER PUBLICATIONS

Office Action dated Mar. 13, 2009 in corresponding Chinese Patent Application No. 200480005365.8 (English Translation provided).

* cited by examiner

SYSTEM AND METHOD FOR TRANSMITTING ULTRAWIDE BANDWIDTH SIGNALS

CROSS-REFERENCE TO RELATED PATENT DOCUMENTS

This application relies for priority on U.S. provisional application Ser. No. 60/450,314, by Richard D. Roberts et al., filed Feb. 28, 2003, entitled "ULTRAWIDE BANDWIDTH FREQUENCY PLAN FOR JAPAN" and U.S. provisional application Ser. No. 60/452,016, by Richard D. Roberts et al., filed Mar. 6, 2003, entitled "WIRELESS COMMUNICATIONS SYSTEM AND METHOD OF OPERATING THE SAME," the contents of both of which are hereby incorporated by reference in their entirety.

FIELD OF THE INVENTION

The present invention relates in general to wireless communication systems, such as ultra-wide band (UWB) systems, including mobile transceivers, centralized transceivers, and related equipment. More specifically the present invention relates to the transmission of data between two wireless devices using multiple frequency bands.

BACKGROUND OF THE INVENTION

As the need for wireless devices increases, wireless UWB implementations are increasingly turned to meet this need. A UWB radio can provide a fast, low power transmission scheme. UWB signals generally have a continuous fractional bandwidth (i.e., the ratio of the −10 dB bandwidth to the center frequency) of at least 25%. However, a signal can fall outside of this basic range and still be considered "UWB." For example, the Federal Communications Commission (FCC) refers to a signal in the 3.1 to 10.6 GHz range with a center frequency of 500 MHz as UWB. Thus, the above measurement is just a rough guideline.

However, UWB devices suffer several important limitations. One of the biggest of these limitations is the restrictions imposed on UWB transmissions by the FCC. In February of 2002, the FCC issued regulations regarding the use of UWB devices. These regulations imposed significant bandwidth and spectral power limits on any UWB transmissions. They also limited the bandwidth available for UWB transmission.

Another limitation in the United States is the presence of the UNII (Unlicensed National Information Infrastructure) band right in the middle of the frequency band allocated to UWB. The FCC has allocated the range of 3.1 GHz to 10.6 GHz for UWB, and the UNII band falls in the range of 5.15 to 5.85 GHz. The UNII band is used by unlicensed devices such as cordless phones and 802.11a wireless local area network (WLAN) devices. Because of the high power levels permitted devices in the UNII band (sometime up to one hundred times the power levels of UWB transmissions), it is preferable for UWB devices to avoid transmitting in those bands.

Although the UNII band is offered as an example of a frequency band that a UWB device may wish to avoid, in some embodiments it may be desirable to avoid other frequency bands.

Furthermore, as the circumstances change, these restrictions may be increased or decreased, reducing or expanding the bandwidth available for UWB transmissions.

In addition, although UWB devices in the United States must meet the restrictions imposed by the FCC and preferably avoid the UNII band, these parameters will not apply in other countries. And though no other country has as yet regulated UWB transmissions, it seems likely that they will impose power and bandwidth restrictions as the FCC has done in the United States. However, it seems equally likely that the specific parameters of these restrictions will not track exactly with the parameters of the restrictions imposed by the FCC.

Furthermore, other countries and regions are likely to have some equivalent to the UNII band, i.e., a band dedicated to cordless phones and WLANs, with varying locations and bandwidth in the available frequency spectrum. For example, the Japanese equivalent of the UNII band falls between 4.90 to 5.4 GHz. UWB devices operating in these regions may wish to avoid these frequency bands as well.

Therefore, it would be desirable to provide a UWB device that would be easily modified to broadcast using different bandwidths and different center frequencies. This would allow the device to account for changes in available spectrum over the course of time, and in different jurisdictions.

It would also be desirable to provide a device that uses all of the available UWB bandwidth, but still avoids certain sensitive bands located within that available bandwidth.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages in accordance with the present invention.

DETAILED DESCRIPTION OF PREFERRED EMBODIMENTS

Figure 1:
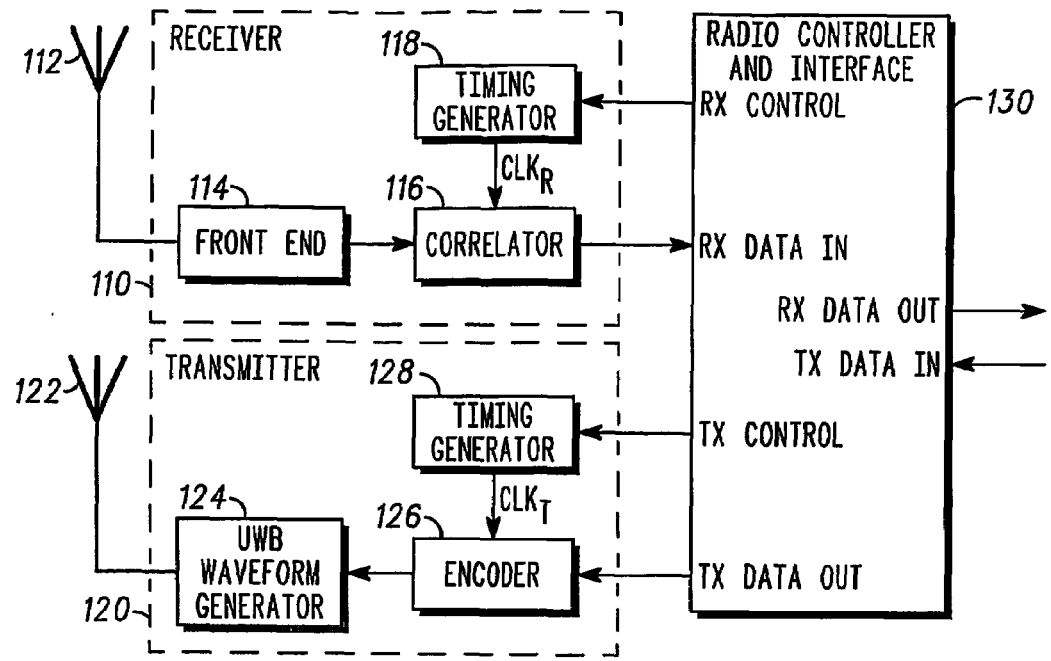
FIG. 1 is a block diagram of an ultra-wide band transceiver according to a preferred embodiment of the present invention.

FIG. 1 is a block diagram of an ultra-wide band (UWB) transceiver according to a preferred embodiment of the present invention. As shown in FIG. 1, the transceiver includes three major components, a receiver 110, a transmitter 120, and a radio controller and interface 130. The receiver 110 is attached to a receiving antenna 112, and includes a front end 114, a UWB waveform correlator 116, and a receiving timing generator 118. The transmitter is attached to a transmitting antenna 122, and includes a UWB waveform generator 124, an encoder 126, and a transmitting timing generator 124.

Although a single radio controller and interface 130 is shown servicing both the receiver 110 and transmitter 120, alternate embodiments could include a separate radio controller and interface 130 for each of the receiver 110 and transmitter 120. In addition, a single antenna that is switched between transmitting and receiving may be used in place of the separate receiving and transmitting antennas 112 and 122. The receiving and transmitting timing generators 118 and 128 may also be combined into a single timing generator or may be maintained as separate units.

The radio controller and interface 130 is preferably a processor-based unit that is implemented either with hard wired logic, such as in one or more application specific integrated circuits (ASICs) or in one or more programmable processors. In operation, the radio controller and interface 130 either serves as a medium access control (MAC) controller or serves as a MAC interface between the UWB wireless communication functions implemented by the receiver 110 and transmitter 120 and applications that use the UWB communications channel for exchanging data with remote devices.

When the transceiver is receiving a signal, the receiving antenna 112 converts an incoming UWB electromagnetic waveform into an electrical signal (or optical signal) and provides this electrical signal to the radio front end 114. Depending on the type of waveform, the radio front end 114 processes the electric signals so that the level of the signal and spectral components of the signal are suitable for processing in the UWB waveform correlator 116. This processing may include spectral shaping, such as a matched filtering, partial matched filtering, simple roll-off, etc.

After front end processing, the UWB waveform correlator 116 then correlates the incoming signal with different candidate signals generated based on a clocking signal from the timing generator 118 to determine whether the receiver 110 is synchronized with the incoming signal and if so, to determine the data contained in the received incoming signal.

The timing generator 118 operates under the control of the radio controller and interface 130 to provide a clocking signal $CLK_R$ that is used in the correlation process performed in the UWB waveform correlator 116. This clocking signal $CLK_R$ has a phase that is preferably varied with respect to the incoming signal received at the receiving antenna 112. The UWB waveform correlator uses the clocking signal $CLK_R$ to locally generate a correlation signal that matches a portion of the incoming signal and has the phase of the clocking signal $CLK_R$. When the locally-generated correlation signal (the locally-generated signal) and the incoming signal are aligned with one another in phase, the UWB waveform correlator 116 provides high signal-to-noise ratio (SNR) data to the radio controller and interface 130 for subsequent processing.

Conceptually, the UWB waveform correlator 116 can be considered to have a correlation window containing the local signal. As the phase of the clocking signal is varied with respect to that of the incoming signal, the correlation window is shifted. The correlation window is then compared to a snapshot of the incoming signal until an acceptable correlation result is obtained for the two signals, indicating that an acquisition lock has been achieved.

In some circumstances, the output of the UWB waveform correlator 116 is the data itself. In other circumstances, the UWB waveform correlator 116 simply provides an intermediate correlation result, which the radio controller and interface 130 uses to determine the data and determine when the receiver 110 is synchronized with the incoming signal.

The UWB waveform correlator 116 operates in two modes of operation, a signal track mode ("track mode") and a signal acquisition mode ("acquisition mode"). The acquisition mode is used when synchronization either has not occurred or has been lost, and the receiver 110 is working to achieve such synchronization. The track mode is used when synchronization has occurred and needs to be maintained.

During the acquisition mode, the radio controller and interface 130 provides a control signal to the receiver 110 to acquire synchronization. This control signal instructs the receiver 110 to slide the correlation window within the UWB waveform correlator 116 to try and match the phase of the incoming, signal and achieve an acquisition lock. In particular, this is achieved by adjusting the phase and frequency of the clock output from the timing generator 118 until a desirable correlation result is obtained.

Once synchronized, the receiver enters the track mode. During the track mode, the transceiver operates to maintain and improve synchronization. In particular, the radio controller and interface 130 analyzes the correlation result from the UWB waveform correlator 116 to determine whether the correlation window in the UWB waveform correlator 116, i.e., the phase of the local signal from the timing generator, needs to be adjusted.

In addition, during track mode, the receiver 110 provides data to an input port ("RX Data In") of the radio controller and interface 130, which in turn provides this data to an external process, via an output port ("RX Data Out"). The external process may be any one of a number of processes performed with data that is either received via the receiver 110 or is to be transmitted via the transmitter 120 to a remote receiver.

When the transceiver is transmitting a signal, the radio controller and interface 130 receives source data at an input port ("TX Data In") from an external source. The radio controller and interface 130 then applies the data to the encoder 126 of the transmitter 120 via an output port ("TX Data Out"). The radio controller and interface 130 also provides control signals to the transmitter 120 for use in identifying the signaling sequence of UWB pulses. As noted above, in some embodiments of the present invention, the receiver 110 and the transmitter 120 functions may use joint resources, e.g., a common timing generator and/or a common antenna.

The encoder 126 receives user coding information and data from the radio controller and interface 130 and preprocesses the data and coding so as to provide a timing input for the UWB waveform generator 124. The UWB waveform generator 124 in turn produces UWB pulses encoded in shape and/or time to convey the data to a remote location. The encoder 126 performs this function in accordance with a timing signal $CLK_T$ received from the transmitting timing generator 128.

The encoder 126 produces the control signals necessary to generate the required modulation. For example, the encoder 126 may take a serial bit stream and encode it with a forward error correction (FEC) algorithm (e.g., such as a Reed Solomon code, a Golay code, a Hamming code, a Convolutional code, etc.). The encoder 126 may also interleave the data to guard against burst errors. The encoder 126 may also apply a whitening function to prevent long strings of "ones" or "zeros." The encoder 126 may also apply a user specific spectrum spreading function, such as generating a predetermined length chipping code (also called a code word) that is sent as a group to represent a bit (e.g., inverted for a "one" bit and non-inverted for a "zero" bit, etc.). The encoder 126 may divide the serial bit stream into subsets in order to send multiple bits per wavelet or per chipping code, and generate a plurality of control signals in order to affect any combination of desired modulation schemes.

The radio controller and interface 130 may provide some identification, such as user ID, etc., of the source from which the data on the input port ("TX Data In") is received. In one embodiment of the present invention, this user ID may be inserted in the transmission sequence, as if it were a header of an information packet. In other embodiments of the present invention, the user ID itself may be employed to encode the data, such that a receiver receiving the transmission would need to postulate or have a priori knowledge of the user ID in order to make sense of the data. For example, the ID may be used to apply a different amplitude signal (e.g., of amplitude "f") to a fast modulation control signal as a way of impressing the encoding onto the signal.

The output from the encoder 126 is applied to the UWB waveform generator 124, which then produces a sequence of UWB wavelet shapes at wavelet times according to the command signals it receives from the encoder 126. These wavelet shapes may be prepared based on one of any number of different schemes. The output from the UWB generator 124 is then provided to the transmitting antenna 40, which then transmits the UWB energy to a receiver.

Preferably the data is encoded into the signal by exploiting the shape of the wavelets. In particular, the data is preferably encoded by bi-phase modulating a series of wavelets arranged according to a binary or ternary chipping code provided by the encoder 126. (A ternary code is used in the preferred embodiment.)

In the preferred embodiment the wavelets used are three consecutive cycles of an oscillating signal, e.g., a sinusoidal waveform. In alternate embodiments, however, this could be altered. The number of cycles could be increased or decreased; the type of oscillating signal could be changed; or a differently shaped waveform could be used altogether, such as a Gaussian monopulse, or the like.

As noted above, the chipping codes, or code words, are strings of individual wavelets that are modulated according to a set pattern. In a preferred embodiment length 12 and 24 ternary code words are used. In other words, each bit is represented by a bi-phase modulated code word, and each code word is represented by a string of 12 or 24 wavelets modulated in a ternary fashion according to a set pattern, e.g., a ternary pattern in the preferred embodiment. For example, a particular transmission might use a length 12 code word as follows: 0 −1 −1 −1 1 1 1 −1 1 1 −1 1. In this case, 12 consecutive wavelets are modulated according to this code to create a code word, i.e., the first wavelet remains unchanged, the second wavelet is inverted, the third wavelet is nulled, the forth wavelet is nulled etc. This code word is then used to represent one value of a bit of data, and its inverse is used to represent the other value of a bit of data.

The code words used could vary according to network, device, or even by transmission. In addition, though code words of length 12 and 24 are preferable in the present embodiment, other code word lengths can be chosen as desired.

Generating a Single Band UWB Signal

Figure 2:
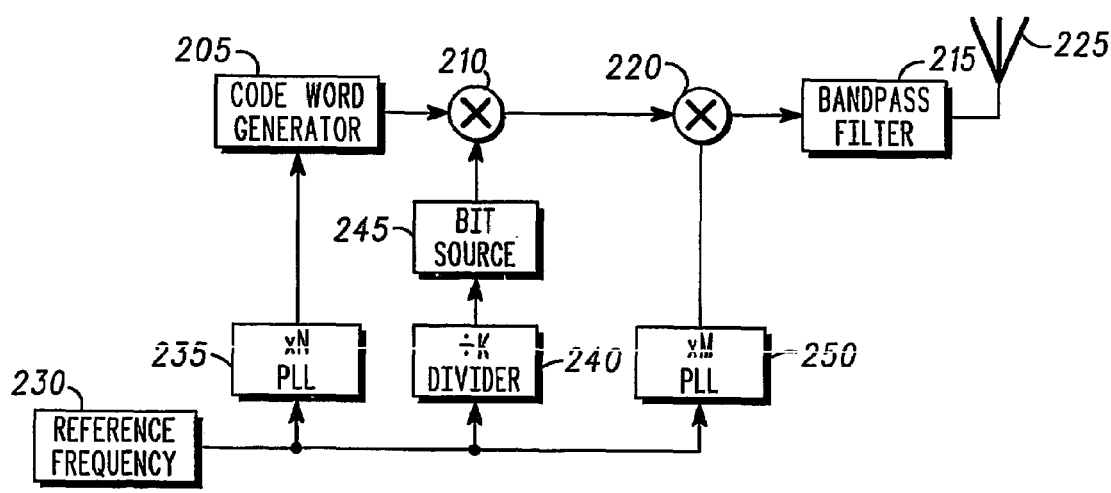
FIG. 2 is a block diagram of a circuit for generating a single-band UWB signal, according to a preferred embodiment of the present invention.

FIG. 2 is a block diagram of a circuit for generating a single-band UWB signal, according to a preferred embodiment of the present invention. As shown in FIG. 2, the signal-generating circuit includes a code word generator 205, a first mixer 210, a band pass filter 215, a second mixer 220, an antenna 225, a reference frequency clock 230, a xN phase-locked loop (PLL) circuit 235, a divide-by-K circuit 240, a bit source 245, and a xM PLL circuit 250. In this embodiment, the circuit uses a repetition of multiple cycles of an oscillating signal as a UWB wavelet.

The reference frequency clock 230 generates a reference signal that will be used by the rest of the circuit. In the preferred embodiment the reference signal is a sinusoidal waveform with a frequency of 684 MHz, though this could be changed in frequency and waveform in alternate embodiments.

In general, the reference signal can have frequency that varies greatly. It could be a very low frequency signal, lower than the center frequency of the lowest band in use, or it could be a very high frequency signal, having a frequency that is as high is higher than the highest band in use. In particular the reference signal preferably has a frequency that corresponds to a value in a center frequency band for the signal generated by the device. This can mean that the reference signal's frequency is within a range of the center frequency of the signal, that the reference signal's frequency is equal to the center frequency of the signal, that the reference signal's frequency is an N times the center frequency of the signal, that the reference signal's frequency is 1/N times the center frequency of the signal, or the like, where N is an integer. Preferably the reference frequency is in the range of 300 MHz to 9.2 GHz, though values outside of that range can be used in some embodiments. In particular, as the speed of devices increases, correspondingly faster reference frequencies can be used. Specific values that are used for the frequency of the reference signal in preferred embodiments include 684 MHz, 1.368 GHz, 2.376 GHz, 4.104 GHz, 5.4 GHz, and 8.208 GHz.

The xN PLL 235 multiplies the reference frequency of the reference signal by N and provides a signal with this new frequency as a clocking signal to the code word generator 205. In the preferred embodiment N=2, so the xN PLL 235 provides a clocking signal to the code word generator 205 that is twice the reference frequency (i.e., 1.368 GHz). However, the value of N could be changed in alternate embodiments to account for different code word lengths and/or spectral bands (specified by center frequency and bandwidth).

The code word generator 205 provides a length L code word used to represent bits of data. The rate at which individual elements of the code word (called chips) are output is equal to the frequency of the clocking signal provided from the xN PLL 235. This rate can be called the chipping rate of the code word generator 205. In the preferred embodiment L=24 and the chipping rate is 1.368 GHz, though these parameters could be changed in alternate embodiments. One preferred alternate embodiment uses a code word length of L=12.

The divide-by-K circuit 240 divides the frequency of the reference signal by K and provides a signal with this new frequency as a clocking signal to the bit source 245. In the preferred embodiment K=12, so the divide-by-K circuit 240 provides a clocking signal to the bit source 245 that is one twelfth the reference frequency (i.e., 57 MHz). However, the value of K could be changed in alternate embodiments to any value (preferably an integer) to account for different data rates.

The product of the value of N for the xN PLL 235 and the value of K for the divide-by-K circuit 240 should be equal to the length L of the code word generated by the code word generator 205, i.e., L=(N×K). Although the value of N and the value of K may vary in alternate embodiments, the equality between their product and the code word length should be maintained.

The bit source 245 provides the bits of data that need to be sent by the device. This can be any sort of desired data source, so long as it provides bit data. The rate at which bits are output is equal to frequency of the clocking signal provided from the divide-by-K circuit 240. This rate can be called the symbol rate of the bit source 445. A given symbol is made up of P bits, where P is an integer greater than 0. Thus, the bit source 445 outputs P bits each time the clocking signal provided from the divide-by-K circuit 240 cycles. In the preferred embodiment P is 1 and the symbol rate is 57 Ms/s, though these values could be changed in alternate embodiments.

The first mixer 210 multiplies the output of the code word generator 205 with the output of the bit source 245. Because the clocking signal provided to the bit source 245 is $$\frac{1}{N \cdot K} = \frac{1}{L}$$

times the frequency of the clocking signal provided to the code word generator 205, the value of P bits are held for the duration of an entire code word (i.e., for the duration of L wavelets). Thus, the first mixer serves to modulate the code word generated by the code word generator 205 with the data bits provided by the bit source 245.

The xM PLL 250 multiplies the frequency of the reference signal by M and provides a signal with this new frequency as a clocking signal as a clocking signal to the second mixer 220. In the preferred embodiment M=6, so the xM PLL 250 provides a clocking signal to the code word generator 205 that is six times the reference frequency (i.e., 4.104 GHz). However, the value of M could be changed in alternate embodiments to account for different code word lengths.

The value of M divided by the value of N is equal to the number of cycles of the reference signal that are used to form each wavelet of the UWB signal used by the circuit of FIG. 2. In this embodiment each wavelet is made up of three cycles of the reference signal, so M=6 (i.e., $$\frac{M}{N} = \frac{6}{2} = 3$$

cycles per wavelet). As the number of cycles per wavelet changes, so too will the value of M.

The second mixer 220 mixes the output of the xM PLL 250 and the output of the first mixer 210. This has the effect of mixing the UWB wavelets generated at the xM PLL 250 with the data-modulated code word output from the first mixer 210, to create a final UWB signal stream. Because the frequency of the signal output from the xM 250 PLL is $$\frac{M}{N}$$

(i.e., 3 in the preferred embodiment) times the frequency provided to the code word generator, the xM PLL 250 will provide 3 cycles of its signal for every element of the code word, thus generating 3-cycle wavelets.

The band pass filter 215 serves to ensure that the transmitted energy is within the proper band. A similar band pass filter can be used in the receiver to protect the received signal from interference from other bands.

The transmitted waveform preferably has a center frequency equal to the reference frequency multiplied by M, i.e., 4.104 GHz in the preferred embodiment, and a −3 dB bandwidth equal to the reference frequency multiplied by N, i.e., 1.368 GHz in the preferred embodiment.

The band pass filter 215 preferably has a center frequency equal to the reference frequency multiplied by M, e.g., 4.104 GHz in a preferred embodiment, and lower and upper cutoff frequencies that define the desired operational band, e.g. upper and lower 20 dB cutoff frequencies of 3.1 GHz and 5.1 GHz, respectively, in a preferred embodiment. This gives a −20 dB bandwidth of about 2.0 GHz. This value is preferably chosen to give a response comparable to the −3 dB bandwidth, which makes the values of the cutoff frequencies used by the band pass filter 215 linearly related to the upper and lower −3 dB bandwidth limits, and so proportional to the reference frequency. Thus, they are easy to calculate.

Of course, the various parameters for reference frequency, bandwidth, and circuit coefficients can vary in alternate embodiments.

The antenna 225 is configured to transmit the signal provided from the second mixer 220.

In alternate embodiments one of the xN PLL 235, the divide-by-K circuit 240, and the xM PLL 250 could be eliminated if the reference frequency were chosen accordingly. In addition, some of the PLLs could be replaced with frequency dividers and vice versa. In this way, any one of the code word generator 205, the bit source 245, and the second mixer 220 could receive the output of the reference frequency clock 230 directly. However, each of these three elements preferably receives a clocking signal that either is the reference signal or is derived from the reference signal.

Also, although FIG. 2 discloses the use of PLL circuits for all of the multiplying circuits, alternate embodiments could use other types of multipliers.

Furthermore, although FIG. 2 discloses the use of a band pass filter 215 after the second mixer 220, alternate embodiments could replace the functionality of the band pass filter 215 with a low pass filter located immediately before the second mixer 220. This low pass filter would preferably have a center frequency equal to the reference frequency multiplied by M, i.e., 4.104 GHz in the preferred embodiment As a result of this circuit design, the frequency response of the circuit of FIG. 2 can be modified relatively easily by simply changing the reference frequency clock 230, and altering the parameters of the band pass filter 215 to account for this change. In particular, the band pass filter 215 is changed by altering its center frequency and its upper and lower cutoff points. These cutoff points can be set according to any of a variety of criteria, but using a −10 dB point (i.e., the point at which the strength of the signal is down 10 dB) or a −20 dB point (i.e., the point at which the strength of the signal is down 20 dB) are preferred criteria.

The bandwidth of the band pass filter 215 is preferably proportional to the reference frequency, though the exact proportion will depend upon what particular cutoff point is used. A −3 dB cutoff frequency should be $$\pm \frac{f_R NR}{2} = \pm 684 \text{ MHz}$$

in the preferred embodiment. Other cutoff frequencies can be extrapolated.

Further modifications (e.g., to the code word length, the chipping length, or the number of cycles per wavelet) can be made simply by modifying the parameters K, L, M, and N. Changes to the chipping length or the number of cycles per wavelet will affect the frequency response of the resulting waveform, so the parameters of the band pass filter 215 should be adjusted accordingly.

Figure 3:
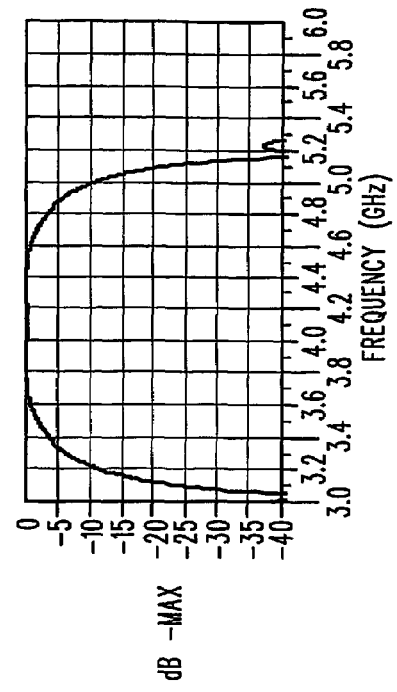
FIG. 3 is a graph showing the frequency response of an ultra-wide band signal produced by the circuit of FIG. 2 according to a first preferred embodiment of the present invention.
Figure 4:
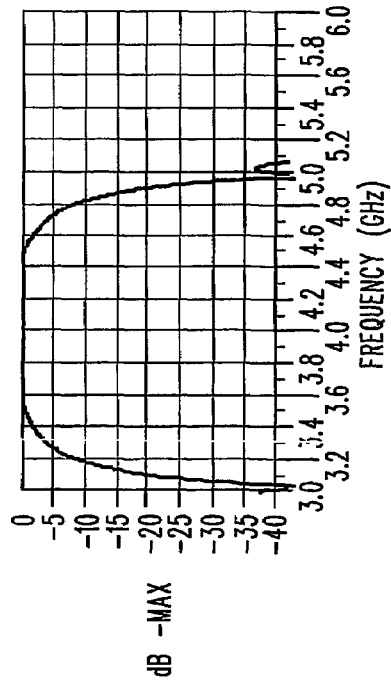
FIG. 4 is a graph showing the frequency response of an ultra-wide band signal produced by the circuit of FIG. 2 according to a second preferred embodiment of the present invention.

FIG. 3 is a graph showing the frequency response of a UWB signal produced by the circuit of FIG. 2 according to a first preferred embodiment of the present invention, and FIG. 4 is a graph showing the frequency response of a UWB signal produced by the circuit of FIG. 2 according to a second preferred embodiment of the present invention.

In the circuit of FIG. 3, the frequency of the reference signal and the center frequency of the band pass filter 215 are both chosen to be 684 MHz, K is 12, L is 24, M is 6, and N is 2, and the −20 dB bandwidth of the band pass filter is about 2 GHz. This provides a signal that can easily avoid UNII band in the United States.

In the circuit of FIG. 4, the frequency of the reference signal and the center frequency of the low pass filter 215 are both chosen to be 666 MHz, K is 12, L is 24, M is 6, and N is 2, and the −20 dB bandwidth of the band pass filter is about 1.8 GHz. This provides a signal that can easily avoid the Japanese equivalent of the U.S. UNII band, which is set at 4.90 TO 5.4 GHz.

FIGS. 3 and 4 graphically show how easily the frequency response of the circuit of FIG. 2 can be modified by altering the frequency of the reference signal generated by the reference frequency clock 230, and the parameters of the band pass filter 215.

Figure 12:
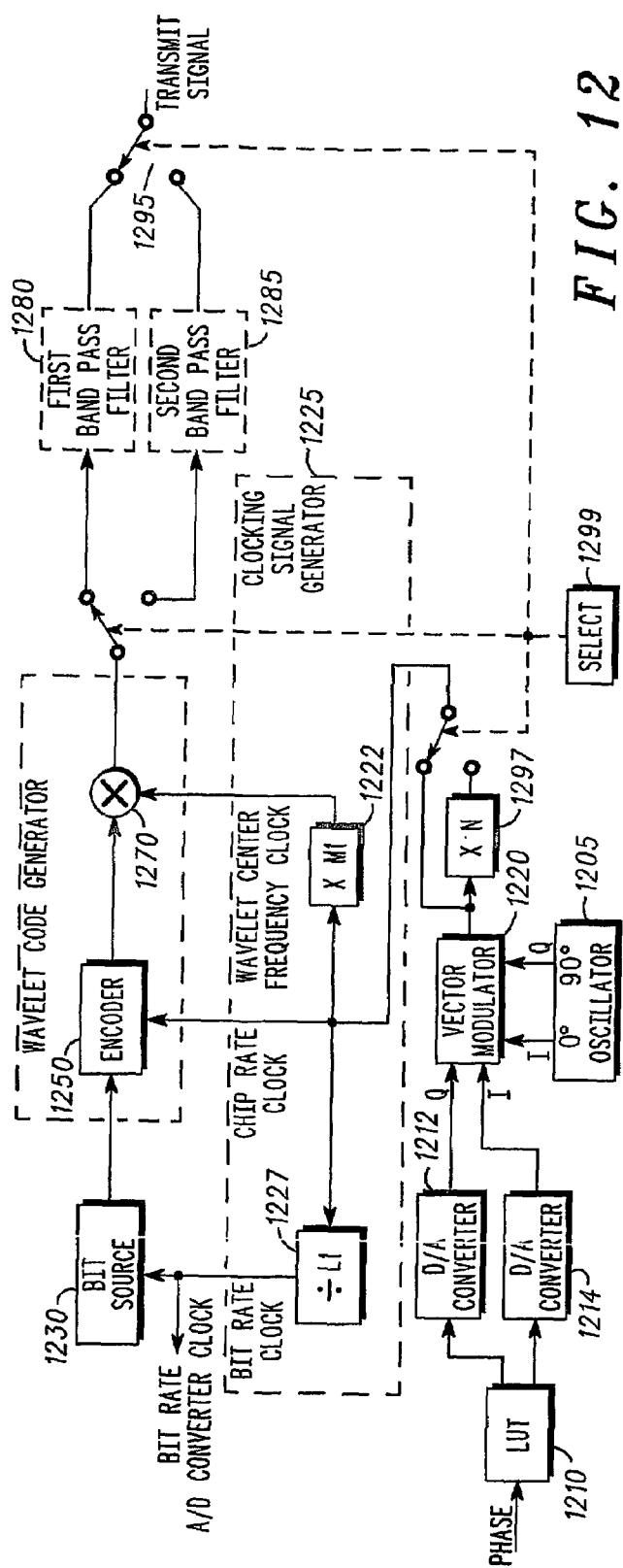
FIG. 12 is a block diagram of a circuit for generating a single-band UWB signal, according to another preferred embodiment of the present invention.

FIG. 12 is a block diagram of a circuit for generating a single-band UWB signal, according to another preferred embodiment of the present invention. As shown in FIG. 12, the signal generating circuit includes an I/Q oscillator 1205, a lookup table 1210 first and second DAC circuits 1212 and 1214, a vector modulator 1220, a clocking signal generator 1225, a bit sources 1230, a wavelet code generators 1240, a switch 1295, a xN circuit 1297, and a selecting circuit 1299. It also may comprise first and second band pass filters 1280 and 1285.

The wavelet code generator 1240 further comprises an encoder 1250 and a mixer 1270. This embodiment of the clocking signal generator further comprises a xM circuit 1222 and a divide-by-L circuit 1227.

The I/Q oscillator 1205 produces an oscillating signal at an oscillating frequency. In the preferred embodiments, the I/Q oscillator comprises a voltage controlled oscillator/phase locked loop (VCO/PLL) that provides a first in-phase and quadrature phase (I/Q) signal.

The lookup table (LUT) 1210 contains data necessary to create sine and cosine waves of varying phase. It is controlled by a phase control signal, which instructs the lookup table 1210 to output the data corresponding the sine/cosine value for that phase. These digital sine and cosine signals are each output at one of the I and Q outputs of the lookup table 1210.

The digital sine and cosine signals are received at the first and second DAC circuits 1212 and 1214, which convert the digital sine and cosine signals into analog sine and cosine signals, These analog sine and cosine signals are output at the I and Q outputs of the DAC circuits 1212 and 1214 as a second I/Q signal.

The vector modulator 1220 accepts the first I/Q signal from the I/Q oscillator 1205 and the second I/Q signal from the first and second DAC circuits 1212 and 1214, and produces a base clocking signal. This base clocking signal has a base clock frequency close to the oscillating frequency (e.g., ±10%), but is varied in phase and frequency based on the value and rate of change of the second I/Q signal.

The clocking signal generator 1225 provides clocking signals to the bit source 1230 and the wavelet code generator 1240. In the disclosed embodiment, the clocking signal generator 1225 provides a bit rate clock, a chip rate clock, and a wavelet center frequency clock. In particular, the clocking signal generator 1225 passes the base clock directly as the chip rate clock, passes the base clock through the xM circuit 1222 to provide a wavelet center frequency clock that has M times the frequency of the base clock, and passes the base clock through the divide-by-L circuit to provide a bit rate clock that is 1/L times the frequency of the base clock.

The bit source 1230 provides the wavelet code generator with a stream of incoming bits. This can be accomplished through the use of an incoming bit stream signal and a data latch, or any other desired means of providing data bits. The bit rate clock instructs the bit source 1230 as to when it should cycle through bit values.

The wavelet code generator 1240 accepts bit data and converts them into an ultrawide bandwidth signal having the bit values modulated into code words. In particular, the encoder 1250 generates a code word that is upright or inverted based on the value of a received bit. The wavelet code generator 1240 generates a coded sequence of wavelets (i.e., chips) based on the chip rate clock. In a preferred embodiment a chip is an inverted or non-inverted wavelet, or could be a null (i.e., a missing or zero) wavelet. This could be altered in other embodiments, however.

Figure 5:
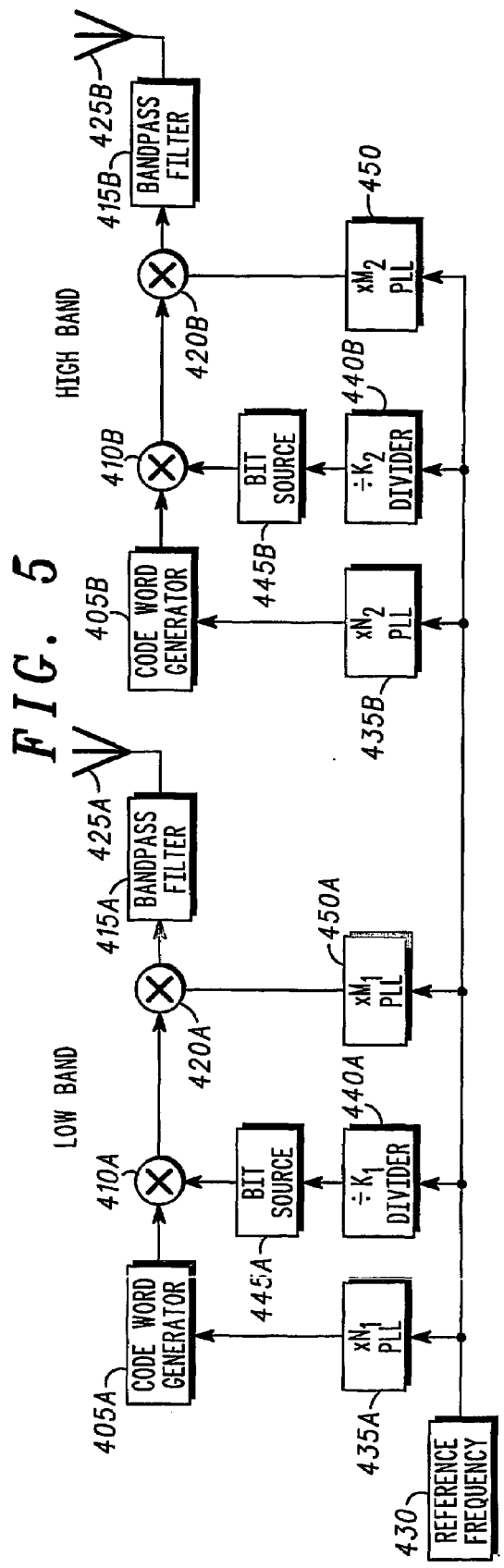
FIG. 5 is a block diagram of a circuit for generating a dual-band UWB signal, according to a preferred embodiment of the present invention.

In one preferred embodiment the encoder 1250 comprises a code word generator and a mixer, as shown by elements 205 and 210 in FIG. 2 and elements 405A, 405B, 410A, and 410B in FIG. 5.

The mixer 1070 modulates the code words generated by the encoder 1050 into wavelets, each chip in the code word being represented by one or more wavelets (as determined the ratio of the chip rate clock and wavelet center frequency clock.

The first and second BPFs 1080 and 1085 serve to remove extraneous frequency elements from the processed signals. Preferably their parameters are determined as noted above with respect to the filters used in the circuit of FIG. 2.

The first, second, and third switches 1291, 1293, and 1295 switch allow the device to selectively choose whether use a first band or a second band. The selecting circuit 1299 provides the signal to choose which band to use. In an embodiment without the BPFs 1280 and 1285, the second and third switches 1293 an 1295 can be eliminated as well.

In operation, if the selecting circuit selects the first band, the first switch 1291 will connect the output of the vector modulator 1230 to the clocking signal generator 1230, and the second and third switches 1293 and 1295 will connect the wavelet code generator 1240 to the output transmit signal via the first BPF 1280. If, however, the selecting circuit selects the second band, the first switch 1291 will connect the output of the xN circuit 1297 to the clocking signal generator 1230, and the second and third switches 1293 and 1295 will connect the wavelet code generator 1240 to the output transmit signal via the second BPF 1285. The xN circuit will provide the clocking signal generator 1230 with an input signal with N times the frequency of the vector modulator 1220.

In this embodiment, N is the ratio of the center frequencies of the first and second bands; M is the number of cycles in a wavelet; and L is the code length used.

In this way, the circuit of FIG. 12 allows for two separate bands, but shares the same elements save for the switches 1291, 1293, and 1295, the xN circuit 1297, and the selecting circuit 1299. This allows for a very small device, and one that can be manufactured more cheaply than other selective band devices.

Generating Multiple Bands

Alternate embodiments can use multiple frequency bands, however. FIG. 5 is a block diagram of a circuit for generating a dual-band UWB signal, according to a preferred embodiment of the present invention. As shown in FIG. 5, the signal-generating circuit includes a first-band code word generator 405A, a first-band first mixer 410A, a first-band band pass filter 415A, a first-band second mixer 420A, a first-band antenna 425A, a first-band $xN_1$ phase-locked loop (PLL) circuit 435A, a first-band divide-by-$K_1$ circuit 440A, a first-band bit source 445A, a first-band $xM_1$ PLL circuit 450A, second-band code word generator 405B, a second-band first mixer 410B, a second-band band pass filter 415B, a second-band second mixer 420B, a second-band antenna 425B, a second-band $xN_1$ phase-locked loop (PLL) circuit 435B, a second-band divide-by-$K_1$ circuit 440B, a second-band bit source 445B, a second-band $xM_2$ PLL circuit 450B, and a reference frequency clock 430. The embodiment disclosed in this circuit uses a repetition of multiple cycles of an oscillating signal as a UWB wavelet.

The elements in the signal-generating circuit of FIG. 5 operate like their counterparts in FIG. 2. However, the first band $xN_1$ PLL 435, the first-band divide-by-$K_1$ circuit 440A, and the a first-band $xM_1$ PLL circuit 450A use parameters $N_1$, $K_1$, and $M_1$, respectively, while the second-band $xN_2$ PLL 435, the second-band divide-by-$K_2$ circuit 440A, and the a second-band $xM_2$ PLL circuit 450A use parameters $N_2$, $K_2$, and $M_2$. These parameters must meet the following parameter:

$$\frac{M_1}{N_1} = \frac{M_2}{N_2}.$$

In other words, both must use the same wavelet (i.e., the same number of cycles per wavelet), though that wavelet is scaled to a different frequency in each band. In addition, although in the preferred embodiment both bands use the same code word length, i.e., $L=(N_1 \times K_1)=(N_2 \times K_2)$, alternate embodiments could use a different code word length for different bands. If the two bands use the same code word length, they can choose the same or different code word sets, as desired.

In alternate embodiments one of the first band $xN_1$ PLL 435, the first-band divide-by-$K_1$ circuit 440A, the first-band $xM_1$ PLL circuit 450A, the second-band $xN_2$ PLL 435, the second-band divide-by-$K_2$ circuit 440A, and the a second-band $xM_2$ PLL circuit 450A could be eliminated if the reference frequency were chosen accordingly. In addition, some of the PLLs could be replaced with frequency dividers and vice versa. In this way, any one of the first-band code word generator 405A, the first-band bit source 445A, the first-band second mixer 420A, second-band code word generator 405B, the second-band bit source 445B, the second-band second mixer 420B could receive the output of the reference frequency clock 430 directly.

Although the circuit of FIG. 5 discloses separate first-band and second-band bit sources 445A and 445B, the two could be combined into one. This combined bit source could either provide its data to one of a plurality of separate UWB signals, or could provide its data to multiple signals, either sending the same data in multiple bands at the same time to enhance successful transmission, or sending different data in multiple bands at the same time to increase throughput.

Furthermore, although the circuit of FIG. 5 uses only two bands, alternate embodiments could be used that employ a greater number of bands. To use additional bands, alternate embodiments can add additional copies of the circuitry of FIG. 2, adjust the various parameters of the circuit to achieve the desired frequency response, and connect that circuit to the reference frequency clock 430.

Figure 6:
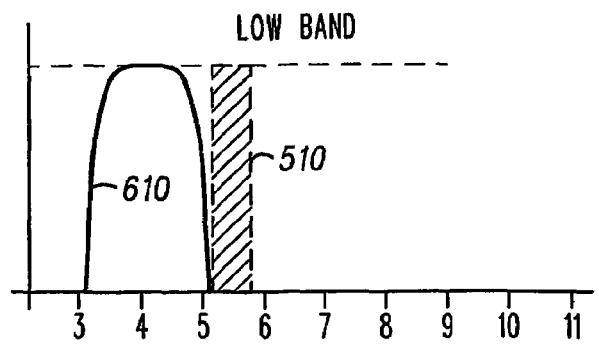
FIG. 6 is a frequency graph of the output of the circuit of FIG. 5 in a low band mode, according to preferred embodiments of the present invention.
Figure 7:
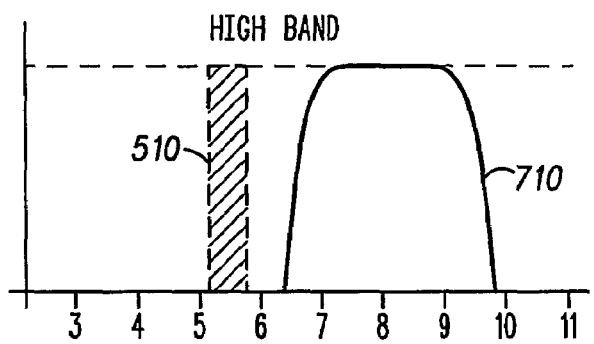
FIG. 7 is a frequency graph of the output of the circuit of FIG. 5 in a high band mode, according to preferred embodiments of the present invention.
Figure 8:
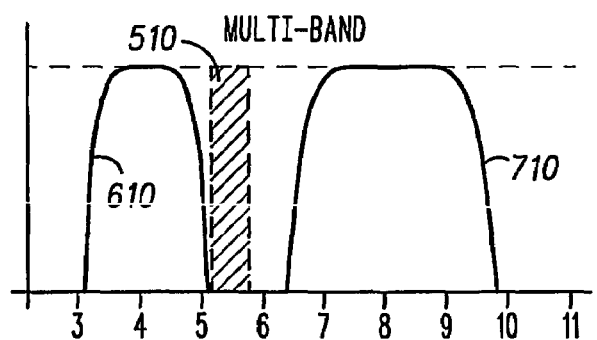
FIG. 8 is a frequency graph of the output of the circuit of FIG. 5 in a dual-band mode, according to preferred embodiments of the present invention.

FIGS. 6, 7, and 8 are frequency graphs of the output of the circuit of FIG. 5 for different modes of operation, according to preferred embodiments of the present invention. FIG. 6 is a frequency graph of a low band mode; FIG. 7 is a frequency graph of a high band mode; and FIG. 8 is a frequency graph of a dual-band mode.

In the embodiments shown in FIGS. 6, 7, and 8, L is 24, $K_1$ is 12, $N_1$ is 2, $M_1$ is 6, $K_2$ is 6, $N_2$ is 4, and $M_2$ is 12, the reference frequency is 684 MHz, the center frequency of the first-band band pass filter 415A is 684 MHz, with an upper −20 dB cutoff of about 5.1 GHz, and a lower −20 dB cutoff of about 5.1 GHz, and the center frequency of the second-band band pass filter 415B is 1.368 GHz. Thus, the clock signal provided to the first-band code word generator 405A is 1.368 GHz; the clock signal provided to the first-band bit source 445A is 57 MHz; the clock signal provided to the first-band second mixer 420A is 4.104 GHz; the clock signal provided to the second-band code word generator 405B is 2.736 GHz; the clock signal provided to the second-band bit source 445B is 114 MHz; and the clock signal provided to the second-band second mixer 420B is 8.208 GHz.

This gives a first band (i.e., the low band) with a code word length of 24, a 3-cycle wavelet, a chipping rate of 1.368 GHz, and a symbol rate of 57 Ms/s, and a second band (i.e., the high band) with a code word length of 24, a 3-cycle wavelet, a chipping rate of 2.736 GHz, and a symbol rate of 114 Ms/s.

As shown in FIGS. 6, 7, and 8, the low band 610 is set between 3.1 and 5.15 GHz, and the high band 710 is set between 5.825 GHz and 10.6 GHz. Both the low band 610 and the high band 710 in this embodiment are arranged so that they do not interfere with the UNII band 510. In an alternate embodiment the low band 610 can be set between 3.5 and 4.6 GHz, and the high band 710 can be set between 7.0 GHz and 9.2 GHz.

In general, different frequencies can be chosen based on a variety of criteria that include: the presence of interfering bands, desired data rates, power consumption restrictions, ease and cost of implementation, etc. For example, higher data rates are possible at higher frequencies, though cost and difficult of implementation will rise. Likewise, different frequency combinations will locate the resulting UWB signal in a particular place in the spectrum. This can be advantageous if the location of the signal remains in a part of the spectrum that avoids strong interfering bands. Regardless, the designs shown above in FIGS. 2 and 5 allow these frequencies to be more easily changed to account for whatever reasons a user might wish to change them.

Figure 10:
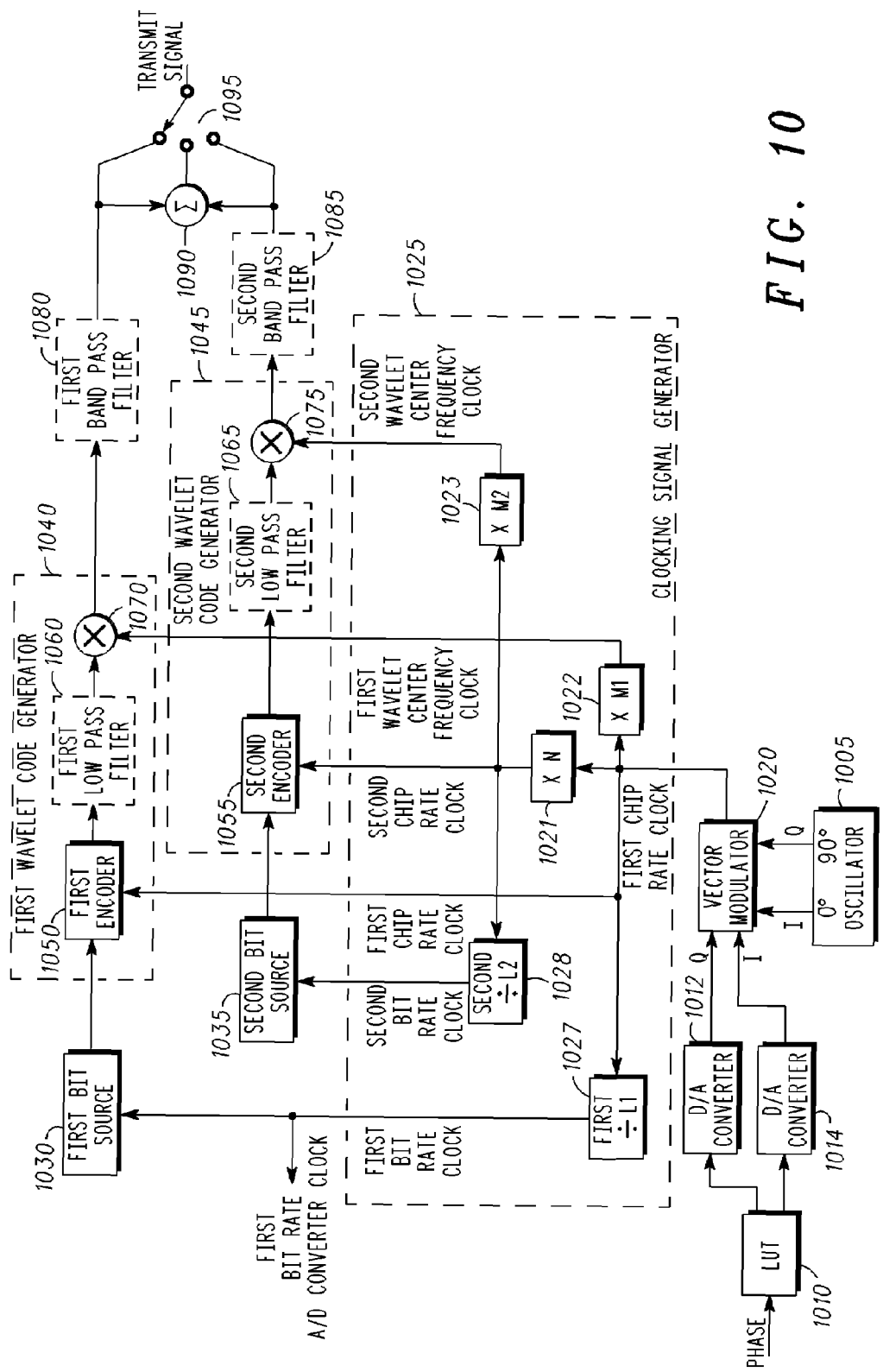
FIG. 10 is a block diagram of a circuit for generating a single or dual-band UWB signal, according to a preferred embodiment of the present invention.

FIG. 10 is a block diagram of a circuit for generating a single or dual-band UWB signal, according to a preferred embodiment of the present invention. As shown in FIG. 10, the signal generating circuit includes an I/Q oscillator 1005, a lookup table 1010 first and second DAC circuits 1012 and 1014, a vector modulator 1020, a clocking signal generator 1025, first and second bit sources 1030 and 1035, first and second wavelet code generators 1040 and 1045, a summer 1090, and a switch 1095. It also may comprise first and second band pass filters 1080 and 1085.

The first wavelet code generator 1040 further comprises a first encoder 1050 and a first mixer 1070, and may comprise a first low pass filter (LPF) 1060. The second wavelet code generator 1045 further comprises a second encoder 1055 and a second mixer 1075, and may comprise a second LPF 1065. This embodiment of the clocking signal generator further comprises a xN circuit 1021, a xM$_1$ circuit 1022, a xM$_2$ circuit 1023, a divide-by-L$_1$ circuit 1027, and a divide-by-L$_2$ circuit 1028.

The I/Q oscillator 1005 produces an oscillating signal at an oscillating frequency. In the preferred embodiments, the I/Q oscillator comprises a voltage controlled oscillator/phase locked loop (VCO/PLL) that provides a first in-phase and quadrature phase (I/Q) signal.

In one preferred embodiment, the I/Q oscillator 1005 could comprise a VCO/PLL that feeds outputs with a 50% duty cycle into the inputs of a poly-phase filter. If the poly-phase filter is chosen to have the required bandwidth and phase/amplitude tolerance, then it will output the desired I/Q signal.

In another preferred embodiment, the I/Q oscillator 1005 could comprise a VCO/PLL operating at twice the desired frequency feeds that outputs a signal with a 50% duty cycle into a pair of divide-by-2 frequency dividers that provide the desired I/Q signal.

In yet another preferred embodiment, the I/Q oscillator 1005 could comprise a VCO/PLL operating at four times the desired frequency feeds that outputs a signal with any duty cycle to a divide-by-4 frequency divider that provides the desired I/Q signal.

The lookup table (LUT) 1010 contains data necessary to create sine and cosine waves of varying phase. It is controlled by a phase control signal, which instructs the lookup table 1010 to output the data corresponding the sine/cosine value for that phase. These digital sine and cosine signals are each output at one of the I and Q outputs of the lookup table 1010.

The digital sine and cosine signals are received at the first and second DAC circuits 1012 and 1014, which convert the digital sine and cosine signals into analog sine and cosine signals, These analog sine and cosine signals are output at the I and Q outputs of the DAC circuits 1012 and 1014 as a second I/Q signal.

The vector modulator 1020 accepts the first I/Q signal from the I/Q oscillator 1005 and the second I/Q signal from the first and second DAC circuits 1012 and 1014, and produces a base clocking signal. This base clocking signal has a base clock frequency close to the oscillating frequency (e.g., +/−10%), but is varied in phase and frequency based on the value and rate of change of the second I/Q signal.

The clocking signal generator 1025 provides clocking signals to the first and second bit sources 1030 and 1035, and the first and second wavelet code generators 1040 and 1045. In the disclosed embodiment, the clocking signal generator 1025 provides first and second bit rate clocks, first and second chip rate clocks, and first and second wavelet center frequency clocks. In alternate embodiments with multiple bands, the clocking signal generator would preferably provide a bit rate clock, a chip rate clock, and a wavelet center frequency clock for each band.

The first and second bit sources 1030 and 1035 provide the first and second wavelet code generators with a stream of incoming bits. This can be accomplished through the use of an incoming bit stream signal and a data latch, or any other desired means of providing data bits. The first and second bit rate clocks instruct the first and second bit sources 1030 and 1035, respectively, as to when they should cycle through bit values.

Each of the first and second wavelet code generators 1040 and 1045 accept bit data and convert them into ultrawide bandwidth signals having the bit values modulated into code words. In particular, the first and second encoders 1050 and 1055 generate a code word that is upright or inverted based on the value of a received bit. The first and second wavelet code generators 1040 and 1045 generate a coded sequence of wavelets (i.e., chips) based on the first and second chip rate clocks, respectively. In a preferred embodiment a chip is an inverted or non-inverted wavelet, or could be a null (i.e., a missing or zero) wavelet. This could be altered in other embodiments, however.

In one preferred embodiment each of the first and second encoders 1050 and 1055 comprise a code word generator and a mixer, as shown by elements 205 and 210 in FIG. 2 and elements 405A, 405B, 410A, and 410B in FIG. 5.

The first mixer 1070 and second mixers 1075 modulate the code words generated by the first and second encoders 1050 and 1055 into wavelets, each chip in the code word being represented by one or more wavelets (as determined the ratio of the corresponding chip rate clock and wavelet center frequency clock.

The first and second LPFs 1060 and 1065, and the first and second BPFs 1080 and 1085 serve to remove extraneous frequency elements from the processed signals. Preferably their parameters are determined as noted above with respect to the filters used in the circuit of FIG. 2.

The summer 1090 adds the output of the first and second wavelet code generators 1040 and 1045, to provide a signal that can be broadcast in both bands.

The switch 1095 allows the device to selectively choose whether to connect an transmission block to the output of the first wavelet code generator 1040 (i.e., the first band alone), to the output of the second wavelet code generator 1045 (i.e., the second band alone), or to the output of the summer 1090 (i.e., the first and second bands combined.)

In the embodiment disclosed in FIG. 10, the clocking signal generator 1025 provides the various clocking signals as follows. The output of the vector modulator 1020 (i.e., the base frequency) is provided unaltered as a first chip rate clock, while the base frequency is passed through the xN circuit 1021 to provide a second chip rate clock that has a frequency of N times the first chip rate clock.

The base frequency is passed through the divide-by-L$_1$ circuit 1027 to provide the first bit rate clock, while the output of the xN circuit 1021 is provided to the divide-by-L$_2$ circuit 1028 to provide the second bit rate clock. Thus, the first bit rate clock is equal to the first chip rate clock divided by L$_1$, while the second bit rate clock is equal to the second chip rate clock divided by L$_2$.

Finally, the base frequency is passed through the xM$_1$ circuit 1023 to provide the first wavelet center frequency clock, while the output of the xN circuit 1021 is provided to the xM$_2$ circuit 1023 to provide the second wavelet center frequency clock. Thus, the first wavelet center frequency clock is equal to the first chip rate clock multiplied by M$_1$, while the second wavelet center frequency clock is equal to the second chip rate clock multiplied by $M_2$.

In this embodiment, $L_1$ is the length of the code word set used by the first band; $L_2$ is the length of the code word set used by the second band; N is the ratio between the center frequencies of the first and second bands; $M_1$ is the number of cycles in a wavelet in the first band; and $M_2$ is the number of cycles in a wavelet in the first band.

In alternate embodiments the clocking signal generator 1025 could be implemented differently. For example, in one alternate embodiment, the output of the vector modulator 1020 (i.e., the base frequency) is provided unaltered as a second wavelet center frequency clock, while the base frequency is passed through a divide-by-N circuit to provide a first wavelet center frequency clock that has a frequency of 1/N times the second wavelet center frequency clock. The base frequency is passed through the divide-by-$M_2$ circuit to provide the second chip rate clock, while the output of the divide-by-N circuit is provided to a divide-by-$M_1$ circuit to provide the first chip rate clock. Finally, the output of the divide-by-$M_2$ circuit is provided to a divide-by-L2 circuit to provide the second bit rate clock, while the output of the xN circuit is provided to the divide-by-$L_1$ circuit to provide the first bit rate clock. In this embodiment, the parameters for $L_1$, $L_2$, N, $M_1$, and $M_2$ are the same as in the embodiment of FIG. 10.

In another alternate embodiment, the output of the vector modulator 1020 (i.e., the base frequency) is provided unaltered as a first chip rate clock, is passed through a divide-by-$L_1$ circuit to provide the first bit rate clock, and is provided to a x$M_1$ circuit to provide the first wavelet center frequency clock. The output of the x$M_1$ circuit is then provided to a xN circuit to provide the wavelet center frequency clock; the output of the xN circuit is provided to a divide-by-$M_2$ circuit to provide the second chip rate clock, and the output of the divide-by-$M_2$ circuit is provided to a divide-by-$L_2$ circuit to provide a second bit rate clock. In this embodiment, the parameters for $L_1$, $L_2$, N, $M_1$, and $M_2$ are the same as in the embodiment of FIG. 10.

In yet another alternate embodiment, the output of the vector modulator 1020 (i.e., the base frequency) is provided unaltered as a first wavelet center frequency clock, is passed through a divide-by-$L_1$ circuit to provide the first bit rate clock, and is provided to a x$M_1$ circuit to provide the first wavelet center frequency clock. The output of the x$M_1$ circuit is then provided to a xN circuit to provide the wavelet center frequency clock; the output of the xN circuit is provided to a divide-by-$M_2$ circuit to provide the second chip rate clock, and the output of the divide-by-$M_2$ circuit is provided to a divide-by-$L_2$ circuit to provide a second bit rate clock. In this embodiment, the parameters for $L_1$, $L_2$, N, $M_1$, and $M_2$ are the same as in the embodiment of FIG. 10.

In alternate embodiments multiple summers or a complex multiplexer could be used to provide different combinations of bands. The switch 1095 could then choose between this variety of available output options. Because of the common clocking source, the alignment of the wavelets in both bands can be forced to a phase that results in the two wavelets having a controlled orthogonality relationship.

Figure 11:
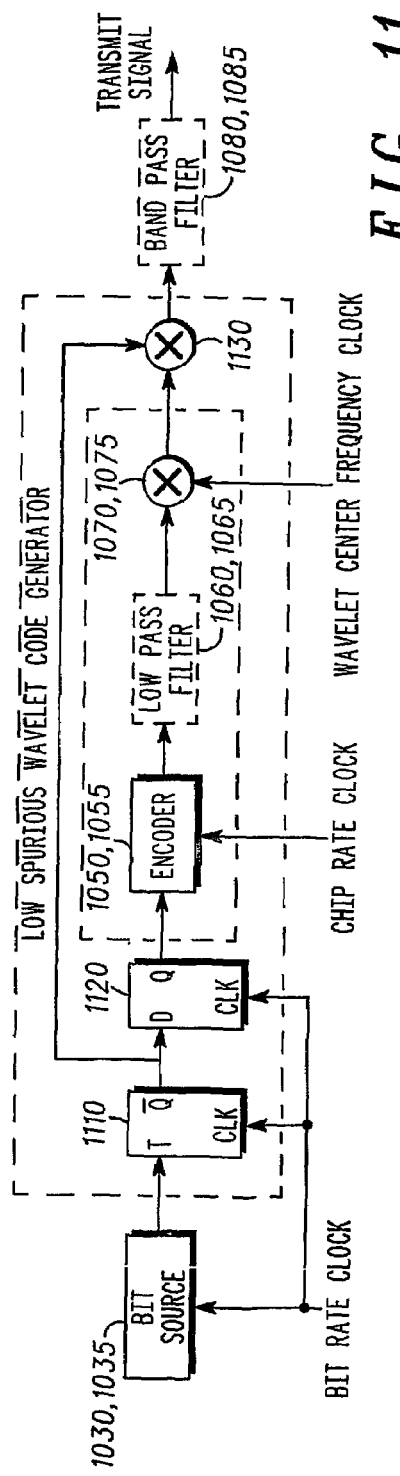
FIG. 11 shows an alternate embodiment of the wavelet code generator path according to a preferred embodiment of the present invention.

FIG. 11 shows an alternate embodiment of the wavelet code generator path according to a preferred embodiment of the present invention. A shown in FIG. 11, a T-flip-flop 1110, a D-flip-flop 1120, and a whitening mixer 1130 can be added to a regular wavelet code generator path to provide an alternate wavelet encoder.

In this embodiment the T-flip-flop 1110 and the D-flip-flop 1120 are provided in series. Since data is random, uncorrelated, and zero mean, when it is fed forward into the whitening mixer 1130 (placed between the mixer 1070, 1075 and the band pass filter 1080, 1085 any spurious tones left in the normal encoder will be whitened by the whitening mixer 1130. For example, if the first or second wavelet center frequency clock leaked through the mixer 1070, 1075 and spread into the data stream, the whitening mixer would remove it.

In addition, alternate embodiments can use a variety of methods to increase the data rate of a UWB transmission. Some embodiments could map multiple bits per symbol (i.e., P can be greater than 1), which may require QPSK waveform modulation for high values of P. Other embodiments may use shorter code word lengths, which may require forward error correction.

Spectral Modes of Operation

The circuit shown in FIG. 5 provides three spectral modes of operation: a low band mode, a high band mode, and a dual-band mode. In the low band mode the device operates only using the low band 610; in the high band mode the device operates only using the high band 710; and in the dual-band mode the device operates using both the low band 610 and the high band 710.

If the low band mode is used, the device is limited to a lower data rate, but enjoys a greater range than the high band mode. This is because of the inherent relationship between data rate and range when all else is constant. Similarly, if the high band mode is used, it can achieve a higher data rate but with a shorter range than the low band mode. And if the dual-band is used a higher data rate than either the low band or the high band mode can be achieved, but the device will be limited to the range of the high band.

Using only the low band mode or only the high band mode also offers the advantage of allowing adjacent networks to engage in frequency division multiplexing. This can be used in place of or in addition to a code division multiplexing scheme based on the use of different code words.

Figure 9:
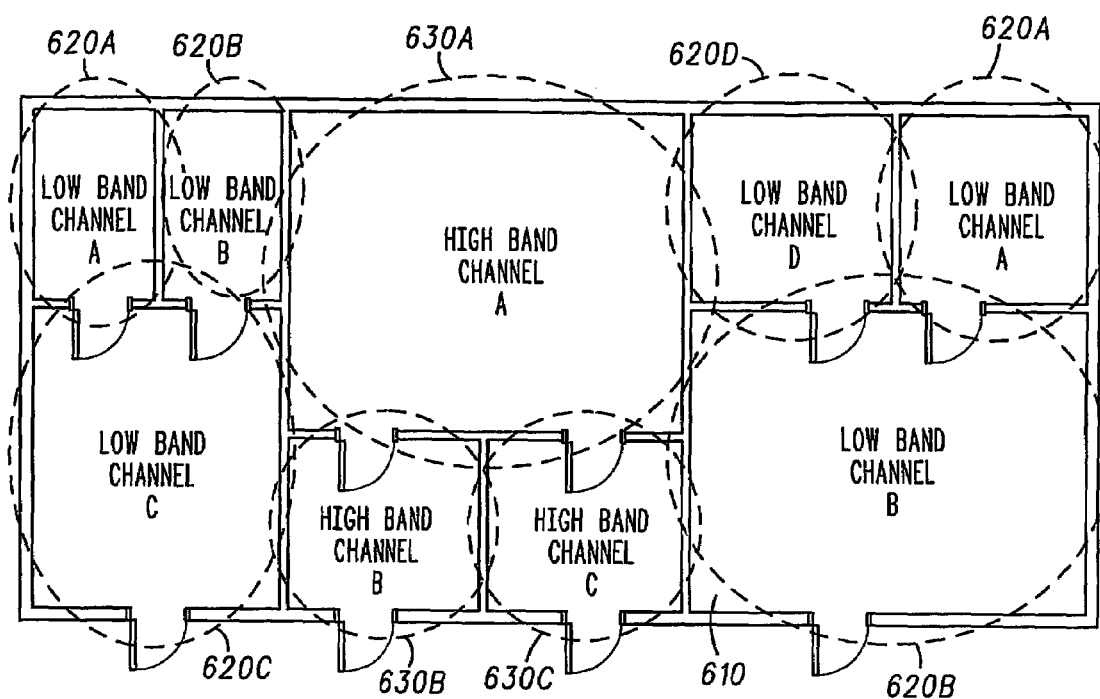
FIG. 9 is a diagram showing a multiple network design using both frequency division multiplexing and code division multiplexing, according to a preferred embodiment of the present invention.

FIG. 9 is a diagram showing a multiple network design using both frequency division multiplexing and code division multiplexing, according to a preferred embodiment of the present invention. As shown in FIG. 9, a plurality of wireless networks 620A, 620B, 620C, 620D, 630A, 630B, and 630C are set up adjacent to each other in a number of nearby rooms 610. In this embodiment there are two bands (high and low) and four sets of code words to choose from. Therefore, there are eight different band-code combinations that can be used.

Adding the ability to change between two bands doubles the number of options available to a network for inter-network interference avoidance. This flexibility can be further increased if more than two bands are used.

Using the dual-band mode can also provide certain unique advantages. For example, it is possible using the dual-band mode to have true duplex communication. With an appropriate diplexer, one transceiver can transmit on one of the bands (high or low), while the other transceiver transmits on the other band.

In addition, forward error correction (FEC) can be used in alternate embodiments. FEC will add complexity, but increase data rate. Thus, these alternate embodiments can trade off the concerns of performance and cost/complexity to implement a desired level of FEC.

It is important to note that in the circuits shown in FIGS. 2 and 5, the center frequency and bandwidth of each of the bands can be changed in alternate embodiments. This gives a tremendous amount of flexibility for these circuit designs to adapt to changing circumstances such as changes in the available spectral allocations. The response of these circuits can be changed by altering one reference frequency clock and a band pass filter for each band.

If the available spectral allocation were reduced, the circuits of FIGS. 2 and 5 could be easily modified to avoid any newly-forbidden frequencies. For example, if spectral protection were provided for the range of 4.9-5.0 GHz, the circuit of FIG. 5 could be modified such that the low band 610 would avoid these frequencies.

Likewise, if the available spectral allocation were increased, the circuits of FIGS. 2 and 5 could be easily modified to take advantage of any newly-available frequencies.

Furthermore, although only a single band and dual-band embodiments are disclosed, multi-band modes using higher numbers of bands are possible. To use additional bands, alternate embodiments can add additional copies of the circuitry of FIG. 2 and adjust the various parameters of the circuit to achieve the desired frequency response. In these embodiments a single reference frequency generator can be provided for all of the bands to use.

However, despite the fact that all of the disclosed preferred embodiments employ a single reference frequency generator for simplicity, alternate embodiments could use multiple frequency generators.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method for generating a multiple band ultrawide bandwidth signal, comprising:
    providing a first reference signal having a first reference frequency;
    multiplying the first reference signal by M to generate a second reference signal having a second reference frequency that is M times the first reference frequency;
    selecting one of the first reference signal and the second reference signal as a selected reference signal having a selected reference frequency;
    dividing the selected reference signal by L to generate a bit rate clock;
    receiving a plurality of data bits based on the bit rate clock; and
    generating an ultrawide bandwidth signal at a transmitter circuit based on the selected reference signal and one of the plurality of data bits, the ultrawide bandwidth signal including two or more pulses having the selected reference frequency,
    wherein M is an integer greater than 1, and
    wherein L is an integer greater than 1.

2. A method for generating a multiple band ultrawide bandwidth signal, as recited in claim 1, wherein the first reference frequency is one of between 300 MHz and 9.2 GHz.

3. A method for generating a multiple band ultrawide bandwidth signal, as recited in claim 1, further comprising:
    multiplying the first reference signal by $K_3$ to $K_N$ to generate third through $N^{th}$ reference signals, having third through $N^{th}$ reference frequencies, respectively,
    wherein the third through $N^{th}$ reference frequencies are equal to $K_3$ through $K_N$ times the first reference frequency, respectively,
    wherein the operation of selecting one of the first reference signal and the second reference signal as a selected reference signal, further comprises selecting one of the first through $N^{th}$ reference signals as the selected reference signal,
    wherein $K_3$ to $K_N$ are all integers greater than 1,
    wherein M and $K_3$ to $K_N$ are all different integers, and
    wherein N is an integer greater than three.

4. A method for generating a multiple band ultrawide bandwidth signal, as recited in claim 1, wherein the first and second reference signals are both derived from a third reference signal.

5. A method for generating a multiple band ultrawide bandwidth signal, as recited in claim 1, a first ultrawide bandwidth signal generated when the first reference signal is selected and a second ultrawide bandwidth signal generated when the second reference signal is selected, wherein the first ultrawide bandwidth signal and the second ultrawide bandwidth signal are encoded using a same code word.

6. A method for generating a multiple band ultrawide bandwidth signal, as recited in claim 1, a first ultrawide bandwidth signal generated when the first reference signal is selected and a second ultrawide bandwidth signal generated when the second reference signal is selected, wherein the first ultrawide bandwidth signal and the second ultrawide bandwidth signal are encoded using different code words.

7. A method for generating a multiple band ultrawide bandwidth signal, as recited in claim 1, executed in an integrated circuit.

8. A method for generating a multiple band ultrawide bandwidth signal, as recited in claim 1, executed in an ultrawide bandwidth transceiver.

9. A device for transmitting ultrawide bandwidth signals, comprising:
    a first reference frequency generator configured to generate a first reference signal having a first reference frequency;
    a second reference frequency generator configured to generate a second reference signal having a second reference frequency that is different from the first reference frequency;
    a selection circuit configured to select one of the first reference signal and the second reference signal as a selected reference signal;
    a bit rate clock generator configured to divide the selected reference signal by L to generate a bit rate clock having a bit rate frequency;
    a bit source configured to generate a bit stream based on the bit rate clock and a plurality of bits;
    a wavelet code generator configured to generate an ultrawide bandwidth signal based on the bit stream and the selected reference signal; and
    an antenna configured to transmit the ultrawide bandwidth signal generated by the wavelet code generator,
    wherein L is an integer greater than 1.

10. A device for transmitting ultrawide bandwidth signals, as recited in claim 9, wherein the second reference signal is derived from the first reference signal.

11. A device for transmitting ultrawide bandwidth signals, as recited in claim 9, wherein the first reference signal is multiplied by N to provide the second reference signal, where N is an integer greater than 1.

12. A device for transmitting ultrawide bandwidth signals, as recited in claim 9, wherein the first reference frequency is between 300 MHz and 9.2 GHz.

13. A device for transmitting ultrawide bandwidth signals, as recited in claim 9, further comprising:
a third reference frequency generator configured to generate a third reference signal having a third reference frequency that is different from the first and second reference frequencies,
wherein the selection circuit configured to select one of the first reference signal, the second reference signal, and the third reference signal as a selected reference signal.

14. A device for transmitting ultrawide bandwidth signals, as recited in claim 9, further comprising:
third through Nth reference frequency generators configured to generate third through Nth reference signals, respectively, the third through Nth reference signals having third through Nth reference frequencies,
wherein all of the third through Nth reference frequencies are different from each other, and
wherein the selection circuit is configured to select one of the first reference signal, the second reference signal, and the third through Nth reference signals as a selected reference signal.

15. A method for generating an ultrawide bandwidth signal, comprising:
providing a first reference signal having a first reference frequency;
providing a second reference signal based on the first reference frequency having a second reference frequency that is different from the first reference frequency;
selectively generating one of a first ultrawide bandwidth signal at a transmitter circuit based on the first reference signal, a second ultrawide bandwidth signal at the transmitter circuit based on the second reference signal, and a summation of both the first ultrawide bandwidth signal and the second ultrawide bandwidth signal at the transmitter circuit.

16. A method for generating a multiple band ultrawide bandwidth signal, as recited in claim 1, further comprising:
multiplying the selected reference signal by N to generate a wavelet center frequency clock,
wherein the wavelet center frequency clock sets a center frequency for the ultrawide bandwidth signal, and
wherein N is an integer greater than 1.

17. A method for generating a multiple band ultrawide bandwidth signal, as recited in claim 16, wherein the generating of the ultrawide bandwidth signal further comprises:
generating a code word based on the one of the plurality of data bits and the selected reference signal, and
modulating the code word based on the wavelet center frequency clock into a wavelet for the ultrawide bandwidth signal, the wavelet including the two or more pulses.

18. A device for transmitting ultrawide bandwidth signals, as recited in claim 9, further comprising:
a wavelet center frequency generator configured to multiply the selected reference signal by M to generate a wavelet center frequency clock,
wherein the wavelet center frequency clock sets a center frequency for the ultrawide bandwidth signal, and
wherein M is an integer greater than 1.

19. A device for transmitting ultrawide bandwidth signals, as recited in claim 18, wherein the wavelet code generator further comprises:
an encoder configured to generate a code word based on the bit stream and the selected reference signal, and
a mixer configured to modulate the code word generated by the encoder based on the wavelet center frequency clock into a wavelet for the ultrawide bandwidth signal.

20. A method for generating a multiple band ultrawide bandwidth signal, as recited in claim 15, further comprising:
multiplying the first reference signal by M1 to generate a first wavelet center frequency clock; and
multiplying the second reference signal by M2 to generate a second wavelet center frequency clock,
wherein the first wavelet center frequency clock sets a first center frequency for the first ultrawide bandwidth signal, and
wherein the second wavelet center frequency clock sets a second center frequency for the second ultrawide bandwidth signal, and
wherein M1 and M2 are both integers greater than 1.

21. A method for generating a multiple band ultrawide bandwidth signal, as recited in claim 20, further comprising:
dividing the first reference signal by L1 to generate a first bit rate clock;
dividing the second reference signal by L2 to generate a second bit rate clock;
receiving a first bit stream based on the first bit rate clock; and
receiving a second bit stream based on the second bit rate clock,
wherein L1 and L2 are each integers greater than 1.

22. A method for generating a multiple band ultrawide bandwidth signal, as recited in claim 21,
wherein the first ultrawide bandwidth signal is generated by:
generating a first code word based on the first bit stream and the first reference signal, and
modulating the first code word based on the first wavelet center frequency clock into a first wavelet for the first ultrawide bandwidth signal, and
wherein the second ultrawide bandwidth signal is generated by:
generating a second code word based on the second bit stream and the second reference signal, and
modulating the second code word based on the second wavelet center frequency clock into a second wavelet for the second ultrawide bandwidth signal.

* * * * *

UNITED STATES PATENT AND TRADEMARK OFFICE
CERTIFICATE OF CORRECTION

| | | |
|---|---|---|
| PATENT NO. | : 7,570,712 B2 | Page 1 of 1 |
| APPLICATION NO. | : 10/546219 | |
| DATED | : August 4, 2009 | |
| INVENTOR(S) | : Matthew L. Welborn et al. | |

It is certified that error appears in the above-identified patent and that said Letters Patent is hereby corrected as shown below:

Title Page

Please correct the named inventors in item (75) of the above-identified Letters Patent to reflect to changes below:

(75) Matthew L. Welborn, Vienna, VA (US); John W. McCorkle, Vienna, VA (US); Richard D. Roberts, West Melbourne, FL (US); Phuong T. Huynh, Annandale, VA (US)

Signed and Sealed this

Twenty-eighth Day of September, 2010

David J. Kappos
*Director of the United States Patent and Trademark Office*